United States Patent
Lillibridge

(10) Patent No.: US 11,361,649 B2
(45) Date of Patent: Jun. 14, 2022

(54) TAMPER RESISTANT DATA MANAGEMENT IN A SENSOR NETWORK

(71) Applicant: McLane Company, Inc., Temple, TX (US)

(72) Inventor: Paul James Lillibridge, Belton, TX (US)

(73) Assignee: McLane Company, Inc., Temple, TX (US)

( * ) Notice: Subject to any disclaimer, the term of this patent is extended or adjusted under 35 U.S.C. 154(b) by 185 days.

(21) Appl. No.: 16/911,243

(22) Filed: Jun. 24, 2020

(65) Prior Publication Data
US 2021/0407277 A1    Dec. 30, 2021

(51) Int. Cl.
G08B 21/18     (2006.01)
H04L 67/12     (2022.01)
H04L 12/66     (2006.01)
G06F 16/23     (2019.01)

(52) U.S. Cl.
CPC ....... *G08B 21/182* (2013.01); *G06F 16/2379* (2019.01); *H04L 12/66* (2013.01); *H04L 67/12* (2013.01)

(58) Field of Classification Search
CPC ... G08B 21/182; G06F 16/2379; H04L 12/66; H04L 67/10; H04L 67/12; H04L 2209/38; H04L 63/0428; H04W 4/38; H04W 4/70; H04W 4/80
See application file for complete search history.

(56) References Cited

U.S. PATENT DOCUMENTS

| | | | |
|---|---|---|---|
| 2018/0220278 A1* | 8/2018 | Tal | G06Q 20/36 |
| 2018/0328612 A1* | 11/2018 | Sinha | G05D 23/1934 |
| 2019/0052453 A1 | 2/2019 | de Ligt | |
| 2019/0303853 A1 | 10/2019 | Cantrell et al. | |
| 2019/0324441 A1 | 10/2019 | Cella et al. | |
| 2019/0349426 A1* | 11/2019 | Smith | H04W 4/08 |
| 2019/0385115 A1 | 12/2019 | Biermann et al. | |
| 2020/0051015 A1 | 2/2020 | Davis et al. | |
| 2020/0064783 A1* | 2/2020 | Tran | F24F 11/0001 |
| 2020/0064815 A1* | 2/2020 | Tran | G06F 16/90335 |
| 2020/0133956 A1* | 4/2020 | Cannon | H04L 63/123 |

OTHER PUBLICATIONS

Patent Cooperation Treaty, International Search Report and Written Opinion issued for PCT Application No. PCT/IB2021/053597, dated Aug. 12, 2021, 12 pages.

* cited by examiner

*Primary Examiner* — Orlando Bousono
(74) *Attorney, Agent, or Firm* — Norton Rose Fulbright US LLP

(57) ABSTRACT

A technical problem corresponds to automated generation of tamper-resistant data that includes measurements corresponding to a physical condition of an environment and times at which these measurements were generated. A solution includes a device for the tamper-resistant generation of data. The device includes a processor configured to generate a copy of the data. The device further includes a network interface configured to send the data to a blockchain node for encoding. The processor is further configured to analyze the copy of the data to identify a physical condition associated with locations at which sensors that generate the data are deployed.

20 Claims, 7 Drawing Sheets

TAMPER RESISTANT DATA MANAGEMENT IN A SENSOR NETWORK

TECHNICAL FIELD

The present application relates to generation and storage of tamper-resistant data received from one or more sensors collecting data in a distributed sensor network.

BACKGROUND

Best practice often requires logistics companies to maintain information about the products that they deliver. For example, if a company handles refrigerated goods, good practice and, in some cases, the law, may necessitate that the company maintains auditable records of the temperatures at which the goods are stored and the times at which the temperature measurements were taken. Further, stores may also maintain records regarding physical properties relating to products, or conditions surrounding the products, that they sell. For instance, supermarkets are often required to maintain data about the temperatures at which they store perishable products, such as diary or frozen produce. As another example, good practice may require maintaining auditable records of levels of gasoline stored in gasoline tanks of gasoline stations.

Typically, measurements of these physical properties are taken throughout the day at designated time intervals. In particular, an employee measures the physical property, such as the temperature of a freezer or the level of gasoline stored in a gasoline tank, at designated times throughout the day. The employee then records these measurements of the physical property and the corresponding times at which these measurements were taken in a notebook or other location.

Complying with these best practices is labor intensive, because personnel must be available to take measurements throughout the day. Additionally, the process of collecting and maintaining these measurements is error-prone, because the data may be collected incorrectly, inconsistently, or, in some cases, not at all. For instance, an employee might forget to take measurements or might forget to record measurements that have been taken. Further, the measurements might be taken incorrectly. For instance, if an employee measures the pressure of a tire, the employee might measure the pressure while the tire is hot, with the result that the measurement might not accurately reflect the pressure of air within the tire. Further, measurements may be taken at some instances of time but not others.

Moreover, manual collection and storage of data is susceptible to data tampering, whereby data entries might be fabricated. For example, rather than periodically performing measurements throughout the day, an employee might fabricate measurements to save time. Alternatively, once measurements are taken and recorded, the measurements could be manipulated.

SUMMARY

Disclosed are systems, methods and devices to provide sensor monitoring of one or more properties and to generate and store tamper-resistant sensor data. In one embodiment, a central hub receives data corresponding to measurements and associated times (e.g., time stamps) at which measurements are generated by one or more sensors including one or more sensor types positioned in various locations. The central hub may be configured to generate a copy of the data for further processing. Additionally, the central hub may be configured to record the data as part of one or more blocks of a blockchain. The blocks of the blockchain may be tamper-resistant yet accessible to users who have a need to receive the data.

The central hub may be configured to process the copy of the data to monitor physical conditions associated with products or associated with environments in which products are stored. The central hub may be provided with pre-identified threshold levels which indicate various levels of alerts and actions that should be taken in response to a physical condition measurement. For instance, a physical condition may correspond to a temperature reading that exceeds a permissible temperature threshold range or a threshold level of fluid being below a designated or acceptable fluid level in a storage container. In response to identifying an exceeded threshold level, the central hub may be configured to generate and send an alert, an instruction, or both to a user of the central hub and/or to a computing device associated with the location at which the existence of the physical condition is identified. The alert may prompt a recipient to take appropriate action to address the physical condition. The instruction may also be a computer-readable instruction that causes the computing device to automatically adjust a factor or factors to address the physical condition.

Further disclosed is a system to generate tamper-resistant data. In one aspect, a plurality of sensors including one or more sensor types may be disposed in a plurality of separate locations. Sensors of the plurality of sensors and of the one or more sensor types may generate measurements at instances of time. At least some of these measurements correspond to a physical condition of a location at which a sensor is disposed and/or to a physical condition of a product proximate to or associated with the sensor. The sensors may send data corresponding to the measurements and corresponding to times at which the measurements were generated to a gateway device. The gateway device may send the data, via a network, to a central hub. In some embodiments, the communication between the sensors and the gateway device may be implemented in one communication protocol, whereas communication between the gateway device and the central hub may be implemented in a second communication protocol. The central hub may receive the data and may generate a copy of the data. The central hub may also encode the data onto a blockchain or may send the data to a node of a blockchain network to be encoded onto the blockchain. The central hub may also process the copy of the data for analysis. For example, the central hub may identify a physical condition associated with a location at which a sensor of the plurality of sensors and of the plurality of sensor types is disposed. In response to identification of the physical condition, the central hub may generate an alert, an instruction, or both. The central hub may send the alert, the instruction, or both, via the network and/or via the gateway device, to a computing device associated with the site of the physical condition.

Additionally, disclosed are methods for the generation of tamper-resistant data. In an embodiment, data is received from a plurality of sensors and a plurality of sensor types disposed in various locations. The received data is encoded in a blockchain data structure, and a copy of the data is generated. The copy of the data is analyzed. In response to detection of a physical condition based on analysis of the copy of the data, an alert, an instruction, or both are generated. The alert, the instruction, or both are sent to a computing device associated with a location associated with the detected physical condition.

Several factors render the disclosed devices, systems, and methods a substantial technological improvement over known devices, systems, and methods. First, the disclosed devices, systems, and methods automate collection of data from disparate sources. A problem with conventional devices, systems, and methods is that they are labor intensive: Measurements and their corresponding times are generally collected and recorded manually and at longer than desirable intervals. Second, the disclosure enhances reliability, auditability, and security of the data by storing the data in a tamper-resistant blockchain data structure. The blockchain data structure uses encryption hashing to encrypt the data so that the data becomes substantially unalterable. Yet, the data may be accessible to users of the disclosed devices, systems, and methods. In this way, a reliable, auditable, secure, and accessible record of the data is readily available. Third, because operations are performed on a copy of the data, patterns can be identified in the copy of the data indicative of a physical condition associated with a product or with an environment in which a product is stored. For example and as explained further below, additional processing of the copy of the data may indicate that a freezer in a compartment of a truck has malfunctioned causing temperatures within the compartment to deviate outside of acceptable ranges. In response to the identification of a physical condition, alerts or instructions can be generated and sent to a computing device associated with the affected location. In this way, action can be taken to address the detected physical condition. Therefore, the disclosure represents an unconventional technological solution to the technological problem of automatically generating secure, reliable, accessible and auditable data while identifying patterns in the data indicative of potential problems.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the disclosed devices, systems, and methods, reference should be made to the implementations illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
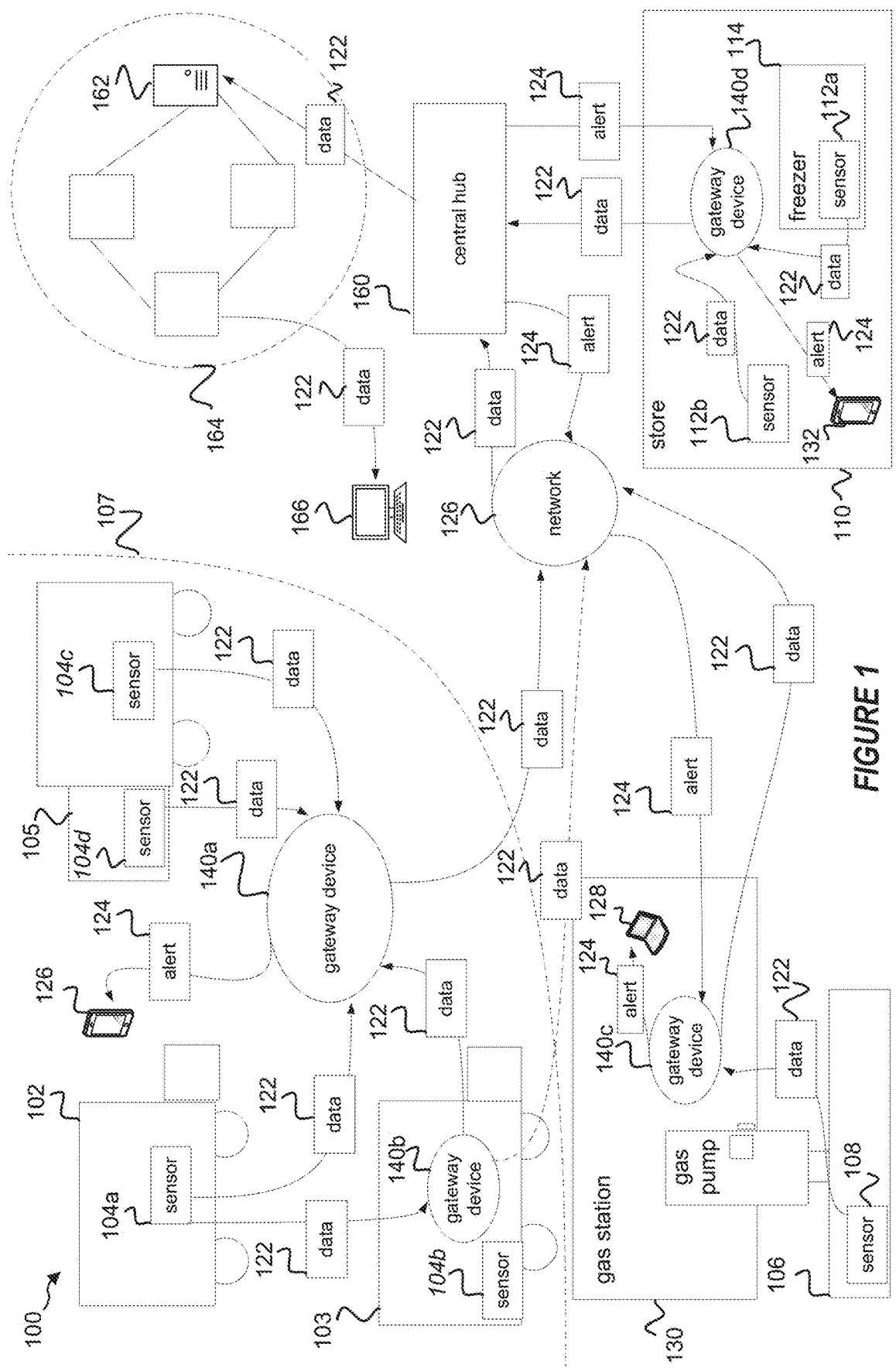
FIG. 1 depicts a system for generating tamper-resistant data in accordance with embodiments of the present disclosure.

FIG. 1 depicts system 100 for the generation and storage of tamper-resistant data. System 100 may include a plurality of sensors, such as sensors 104a-d, 108, 112a-b, disposed in a plurality of locations. System 100 may additionally include gateway devices 140a-d, network 126, central hub 160, and blockchain node 162. Central hub 160 may be configured to receive data 122 via network 126. Data 122 may include measurements generated at the plurality of sensors 104a-d, 108, and 112a-b. Additionally, data 122 may include times (e.g., time stamps) associated with each measurement. Central hub 160 may be configured to send data 122 to blockchain network 164 via one or more blockchain nodes 162. Blockchain node 162 may be configured to encode data 122 onto a blockchain. In an implementation, blockchain node 162 may correspond to a blockchain server which is a component of blockchain network 164. The blockchain may be accessible via a computing device such as computing device 166. For instance, computing device 166 may be associated with an auditor, with a government regulatory agency, customer, or other organization desiring to access data 122 stored on the blockchain. Data 122, encoded onto the blockchain, may be unalterable (e.g., tamper-resistant) at least due to use of a encryption hash to encode data 122. Central hub 160 may be further configured to generate a copy of data 122. Central hub 160 may be configured to manipulate and process the copy of data 122. In this manner, data 122, encoded onto the blockchain, comprises an unalterable record of certain physical conditions in a plurality of locations at which sensors 104a-d, 108, and 112a-b are disposed. For instance, the physical conditions may correspond to a temperature of a compartment of vehicle 102, a level of gasoline in gasoline tank 106 of gasoline station 130, or a temperature of freezer 114 located in store 110. As another example, the physical conditions may correspond to the operating conditions of vehicle 105, where the operating conditions may include an amount of fuel available on vehicle 105 to operate a power supply of a generator of a refrigeration unit on vehicle 105. By analyzing a copy of data 122, central hub 160 may identify a physical condition of a location at which a sensor of the plurality of sensors 104a-d, 108, 112a-b is disposed without attempting to manipulate data 122 stored on the blockchain. In an implementation, central hub 160 may generate alert 124 (e.g., an alert message) in response to the existence of a particular physical condition identified through analysis, at central hub 160, of the copy of data 122. In an implementation, central hub 160 may send alert 124 through network 126 to a gateway device (e.g., gateway device 140a). The gateway device may then relay alert 124 to the appropriate computing device (e.g., computing device 126). In another implementation, central hub 160 may send alert 124 to network 126, and network 126 may relay alert 124 to a computing device associated with a location at which a physical condition has been detected. For example, if a physical condition corresponds to temperatures deviating from an acceptable temperature range, central hub 160 may send alert 124 directly to computing device 132 associated with store 110 rather than sending alert 124 via network 126. In other implementations, however, central hub 160 may send alert 124 via network 126.

The plurality of sensors may be positioned in a plurality of disparate locations. For instance, sensor 104a may be positioned within a compartment of vehicle 102, while sensor 108 may be positioned in gasoline tank 106 of gasoline station 130. As another example sensor 112a may be positioned in freezer 114 of store 110, while sensor 112b may be positioned within store 110 itself to measure a physical condition of the environment within store 110 (e.g., a temperature of air within store 110). The plurality of sensors may correspond to a plurality of sensor types. For instance, vehicle 105 may include sensor 104c and sensor 104d. Sensor 104c may be configured to measure physical conditions within a compartment of vehicle 105. Sensor 104d may include a plurality of sensing modules (described in the context of FIG. 2) configured to measure a plurality of operating conditions of vehicle 105. Operating conditions of vehicle 105 may include a fluid levels within the vehicle, such as a level of lubricating oil within vehicle 105, a level of transmission fluid within vehicle 105, an amount of fuel within vehicle 105, or any of the foregoing. Additionally, sensor 104d may include a plurality of sensor modules configured to measure conditions of an engine of vehicle 105, such as a measurement corresponding to a volume of air entering the engine of vehicle 105.

Figure 2:
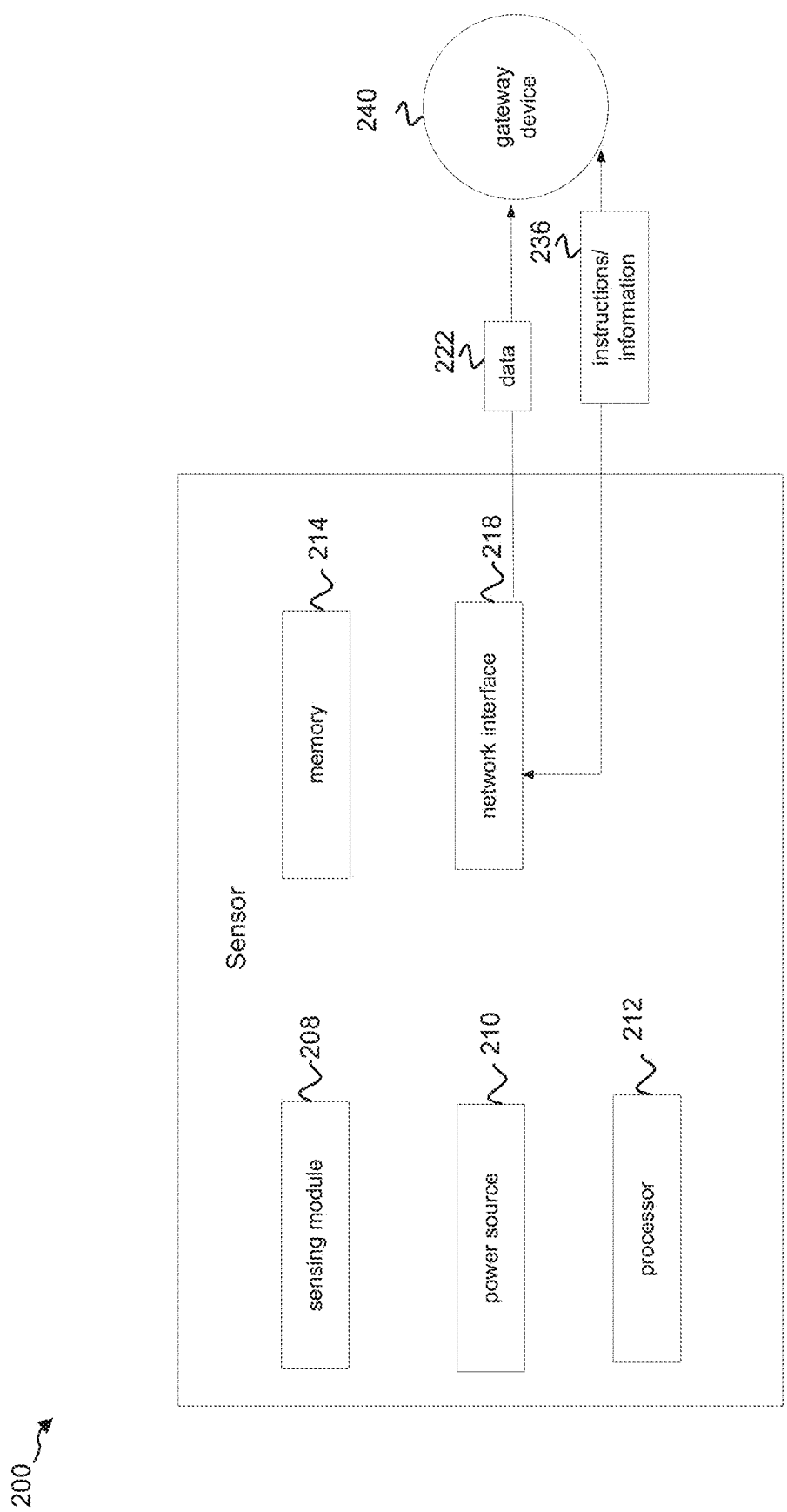
FIG. 2 depicts an exemplary sensor in accordance with embodiments of the present disclosure.

As another example, sensor 104a may be a temperature sensor configured to measure a temperature within a compartment of vehicle 102, such as a freezer compartment of vehicle 102. Sensor 108 may be a fluid level sensor configured to measure a level of fluid within a tank, such as a level of gasoline within gasoline tank 106. Other sensors may include pressure sensors, light sensors, or other sensors configured to measure other physical conditions. A sensor of the plurality of sensors may include a network interface configured to send data 122 to a gateway device, such as gateway devices 140a-d. For instance, a sensor of the plurality of sensors may include a Bluetooth™ transmitter configured to send data 122. Additionally or alternatively, a sensor of the plurality of sensors may send data 122 through wired connections. In other examples, a sensor of the plurality of sensors may transmit data 122 through the Zigbee™ protocol, through WiFi, or through other communication standards known in the art such as, without limitation, the 802.11 wireless communication standard or cellular communication protocols such as 3G, 4G, or 5G protocols. FIG. 2 further details the operation of sensors 104a-d, 108, and 112a-b.

Figure 3:
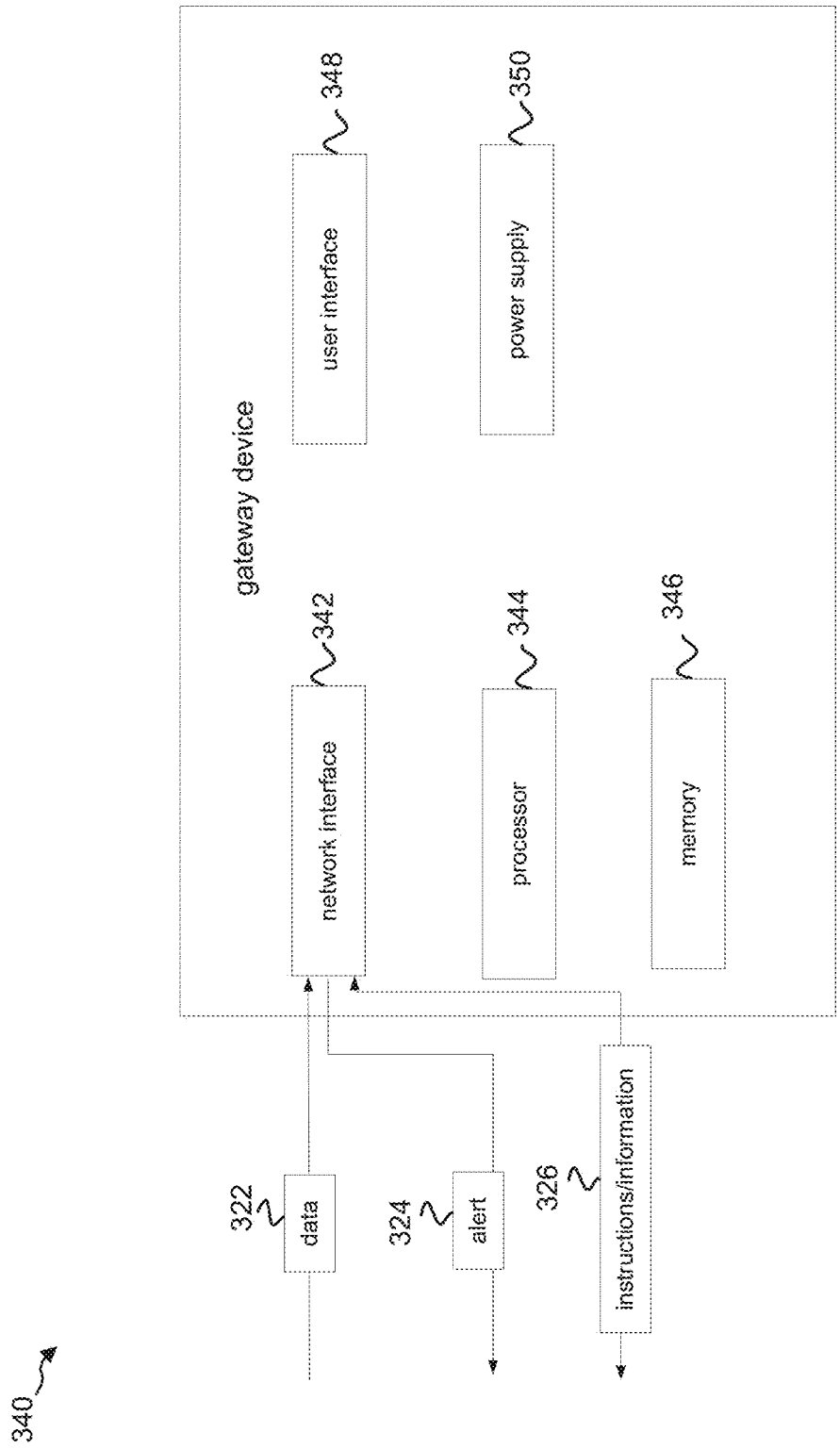
FIG. 3 depicts a gateway device in accordance with embodiments of the present disclosure.

The plurality of sensors, such as sensors 104a-d, 108, 112a-b, may be configured to send data 122 to a gateway device, such as gateway devices 140a-d. A gateway device, such as gateway devices 140a-d, may include a network interface configured to send data 122 and to receive information including alerts 124. For instance, in an implementation, a network interface of a gateway device, such as gateway devices 140a-d, may be a transceiver configured to receive data 122, to transmit data 122, to receive alerts 124, and to transmit alerts 124. A gateway device, such as gateway devices 140a-d, may be configured to send alerts 124 to computing devices 126, 128, and 132. In an implementation, a gateway device, such as gateway devices 140a-d, may send data 122 to central hub 160 via network 126. A gateway device, such as gateway device 140a-d, may be configured to receive alerts from central hub 160 via network 126. In implementations, a network interface of a gateway device may be configured to send and receive data via cellular communication using cellular communication protocols such as 3G, 4G, and 5G communication protocols. FIG. 3 provides additional details regarding gateway devices 140a-d.

In implementations, a gateway device may support a single sensor, a plurality of sensors in a sensor network, a single computing device, a plurality of computing devices in a network, or any combination of the foregoing. Further, a gateway device may send information to and receive information from other gateway devices. For example, yard 107 (e.g., a truck yard) may include a plurality of vehicles (e.g. trucks), such as vehicles 102, 103, and 105. Gateway device 140a may be configured to receive data 122 from sensor 104a positioned in a compartment (e.g., a refrigeration compartment) of vehicle 102 (e.g., a truck). Gateway device 140a may be further configured to receive data 122 from sensor 104b positioned in vehicle 103 and from gateway device 140b also positioned within vehicle 104b. Further, gateway device 140a may receive data 122 from sensors 104c-d positioned within vehicle 105. In some implementations, a gateway device, such as gateway devices 140c-d, may relay data 122 to network 126, and network 126 may then relay data 122 to central hub 160. In other implementations, a gateway device may relay data directly to central hub 160. For example, gateway device 140d may receive data 122 from sensor 112b positioned within store 110, and gateway device 140d may send data 122 directly to central hub 160 (e.g., without sending data 122 to network 126). Additionally, in an implementation, a gateway device may send alert 124 (generated at central hub 160 and received via network 126) to computing device 126, which may be associated with vehicles 102, 103, 105. Additionally or alternatively, gateway device 140a may be configured to send alert 124 to one or more computing devices disposed within vehicles 102, 103, 105. In implementations, a gateway device, such as gateway devices 140a-d, may receive alerts, such as alert 124, generated at central hub 160 via network 126. However, in other implementations, a gateway device, such as gateway devices 140a-d, may receive alerts, such as alert 124, directly from central hub 160. For instance, gateway device 140d may receive alert 124 from central hub 160 and may send alert 124 to computing device 132 associated with store 110. Without limiting any of the foregoing examples, it is understood that gateway device 140a-d may communicate with sensors 104a-d, 108, 112a-b without relaying the communication to a network, such as network 126.

Network 126 may be a wide area network (WAN), a local area network (LAN), or a metropolitan area network (MAN). Additionally or alternatively, network 126 may be the Internet. Central hub 160 may receive data 122 through network 126 and may send information, such as alerts 124, through network 126. Central hub 160, as further detailed in FIG. 4, may be configured to send data 122 to blockchain node 162. Prior to sending data 122 to blockchain node 162, central hub 160 may be configured to generate a copy of data 122. Central hub 160 further may be configured to process the copy of data 122. In this manner, central hub 160 may be configured to perform operations on the copy of data 122 while storing data 122 on a blockchain. Storing data 122 on a blockchain without performing operations on data 122 is advantageous, because measurements of physical conditions and associated timestamps associated with each measurement (indicating a time at which the measurement was taken) and corresponding to data 122 permits supply chain stakeholders, such as regulators and users of system 100 to have access to data 122 while ensuring that data 122 stored on the blockchain is tamper-resistant.

FIG. 2 depicts an exemplary sensor 200 in accordance with an implementation of the disclosure. Sensor 200 may correspond to sensors 104*a-d*, 108, or 112*a-b* of FIG. 1. Sensor 200 may be positioned in different locations. For instance, sensor 200 may be positioned in a compartment of a vehicle, such as a compartment of vehicle 102 of FIG. 1. Additionally or alternatively, sensor 200 may be positioned in a gasoline tank such as gasoline tank 106 of FIG. 1. In other implementations, sensor 200 may be positioned in a refrigerator or freezer, such as freezer 114 located in a store such as store 110 of FIG. 1. As another example, a plurality of sensors may be positioned in a same or similar location. For example, sensors 104*c*, 104*d* may be positioned in different locations within vehicle 105.

Sensor 200 may include a sensing module 208, power source 210, processor 212, memory 214, and network interface 218. Sensing module 208 may include components tailored to the physical condition that sensor 200 is configured to measure. For example, if sensor 200 is configured to measure temperature, sensing module 208 may include a thermocouple, a thermistor, a resistance temperature detector, an infrared detector, or any other means to obtain a temperature reading. If sensor 200 is configured to measure pressure, sensing module 208 may include, for example, piezoelectric components or other components known in the art that are used to measure pressure of a fluid (e.g., air). Additionally or alternatively, if sensor 200 is configured to measure a level of fluid in a container (e.g., a level of gasoline in a gasoline tank), sensing module 208 may include, for example, a pneumatic level sensor component. In addition to components configured to detect a physical condition of an environment in which the sensor 200 is positioned, sensing module 208 may include analog and mixed signal electronics configured to convert the detected physical parameter corresponding to a physical condition into an electronic signal for further processing. In implementations, sensor 200 may include a plurality of sensing modules 208 configured to measure different types of physical conditions. For instance, a first sensing module may measure a temperature, such as a temperature within an engine of a vehicle. A second sensing module may measure a volume of air taken into the engine of a vehicle.

Sensor 200 may be configured to measure a plurality of physical conditions. For example, sensor 200 may be configured to measure temperature, humidity, air pressure, and location (e.g., using GPS signals). In other implementations, sensor 200 may be configured to measure a particular physical condition such as temperature or humidity. Although specific examples of measured physical conditions are set forth herein, the physical conditions that sensor 200 may be configured to measure are not limited to the described physical conditions.

Sensor 200 may include power source 210. Power source 210 may be a wired power source. Alternatively or additionally, power source 210 may be a non-wired power source, such as a battery. For instance, power source 210 may be a rechargeable lithium battery. Sensor 200 may include memory 214 to store data 222. Further, sensor 200 may include processor 212. Processor 212 may cause memory 214 to store data 222. Additionally, processor 212 may cause sensing module 208 to periodically or to aperiodically sense a physical condition of an environment in which sensor 200 is disposed. In implementations, to reduce power consumption by sensor 200, processor 212 may be configured to cause sensing module 208 to sense the physical condition of the environment at particular instances of time. Alternatively or additionally, processor 212 may be configured to cause sensing module 208 to sense the physical condition of the environment in response to input received by a user of system 100.

Processor 212 may cause network interface 218 to send data 222 to gateway device 240. Network interface 218 may be a network interface card (NIC). Alternatively or additionally, network interface 218 may be a transmitter. In embodiments, network interface 218 may be a Bluetooth™ network interface or a network interface that uses the Zigbee™ communication protocol to send data such as data 222. Other network interfaces known in the art may be used. For instance, in implementations, cellular communication protocols such as 3G, 4G, and/or 5G communication protocols may be employed. Although sensor 200 is depicted as including network sensing module 208, power source 210, processor 212, memory 214, and network interface 218, sensor 200 may include only some of these components and not others. Further, sensor 200 may include components not necessarily described herein. For instance, in implementations, sensor 200 may be a radio frequency identification (RFID) tag. It is understood that in implementations in which sensor 200 corresponds to a RFID tag, sensor 200 may not include power source 210 but may include a second device (e.g., a reader) to read the RFID tag. Processor 212 may be configured to apply a time stamp to measurements taken at the sensing module 208 and converted by the analog and mixed signal electronics of sensing module 208 into data 222.

Memory 214 may include computer-readable instructions configured to cause processor 212 to perform sensing-related functions. For example, computer-readable instructions stored on memory 214 that are readable by processor 212 may cause processor 212 to initiate sensing operations at sensing module 208. In response to the computer-readable instructions, processor 212 may store data 222 in memory 214. Further, in response to the computer-readable instructions, processor 212 may cause network interface 218 to send data 222 to gateway device 240. Alternatively, processor 212 may cause network interface 218 to send data 222 directly to central hub 160. In other implementations, processor 212 may cause network interface 218 to send data 222 to a central hub (e.g., central hub 160) via a network (e.g., network 126).

Although it is anticipated that sensor 200 may primarily generate and send data, such as data 222, in implementations, sensor 200 may receive information (e.g., data), instructions, or both (e.g., instructions/information 236). For example, instructions/information 236 may be received from gateway device 240. The instructions may include computer-readable instructions sent by a central hub (e.g., central hub 160) via a network (e.g., network 126) to gateway device 240. Gateway device 240 may relay instructions/information 236 to sensor 200 (e.g., by sending instructions/information 236 to network interface 218). As an example, instructions/information 236 may include an instruction to processor 212 to cause processor 212 to initiate a sensing operation at sensing module 208. As another example, instructions/information 236 may include data about gateway device 240 (e.g., communication protocols to effectuate communication between gateway device 240 and sensor 200). Additionally, in examples, sensor 200 may send instructions/information 236 to gateway device 240, and gateway device 240 may relay instructions/information 236 to a central hub. For instance, the instructions/information 236 may include information about communication protocols of sensor 200.

FIG. 3 depicts a gateway device 340. Gateway device 340 may correspond to gateway devices 140a-d depicted in FIG. 1. Gateway device 340 may be configured to receive data 322 from a plurality of sensors such as sensor 200. Gateway device 340 may be configured to send data 322 via a network such as network 126 of FIG. 1 to a central hub, such as central hub 160 of FIG. 1. Further, gateway device 340 may be further configured to receive alerts, such as alert 324, via a network from the central hub and to send the alerts to computing device, such as computing devices 126, 128, 132 of FIG. 1, associated with environments in which sensors are disposed. Gateway device 340 may include network interface 342, processor 344, memory 346, user interface 348, and power supply 350.

Network interface 342 may be any wired or wireless component known in the art and configured to receive and send data, such as data 322 and alerts 324 (e.g., alert messages), through a network, such as network 126 of FIG. 1. Further, network interface 342 may be configured to send instructions/information 326, to receive instructions/information 326, or both. For instance, network interface 342 may be configured to send instructions/information 326 to a central hub (e.g., central hub 160 of FIG. 1), to receive instructions/information 326 from the central hub, or both. As another example, network interface 342 may be configured to send instructions/information 326 to a sensor (e.g., sensor 200 of FIG. 2). In implementations, network interface 342 may be a transceiver that is configured to receive and transmit data such as data 322, alerts 324 (e.g., alert messages), and/or instructions/information 326. Further, network interface 342 may include an Ethernet connection to receive data through wired connections. Network interface 342 may include both wireless and wired functionality. In implementations, network interface 342 may be configured to send and receive data in accordance with WiFi protocols, 802.11 protocols, or other wireless protocols. For instance, network interface 342 may be configured to send and receive data in accordance with cellular wireless protocols such as 3G, 4G, and 5G wireless protocols. In examples, gateway device 340 may be configured to communicate with sensors (e.g., sensors 104a-d, 108, 112a-b) without sending and receiving the data to a network, such as network 126 of FIG. 1.

Gateway device 340 may include processor 344. Processor 344 may be configured to cause network interface 342 to send and receive information, such as data 322, alerts 324, and/or instructions/information 326. Additionally, processor 344 may be configured to store information, such as data 322, alerts 324, and/or instructions/information 326 in memory 346. Memory 346 may store computer readable instructions configured to operate gateway device 340. Further, processor 344 also may be configured to operate user interface 348. User interface 348 may be a graphical user interface configured to receive inputs from a user of gateway device 340 and to render human readable outputs. In other implementations, gateway device 340 may lack a user interface 348. For instance, a gateway device, such as gateway device 340, that is deployed in a harsh environment (e.g., outdoors) may lack user interface 348. Power supply 350 may be a wired power supply, a mobile power supply such as a battery, or both. In an example, a generator associated with a location at which a sensor, such as sensor 200, is positioned might correspond to power supply 350. To illustrate and referring to FIG. 1, a generator associated with gasoline station 130 may be coupled to gateway device 340 and may serve as power supply 350 for gateway device 340.

Gateway device 340 may be deployed in various ways. For example, and referring to FIG. 1, gateway device 340 may be deployed in a central outdoor location, such as yard 107 (e.g., a truck yard), where gateway device 340 may be configured to receive information (e.g., data 122) from a plurality of sensors, such as sensors 104a-d positioned in a plurality of locations such as in vehicles 102, 103, 105 and send information (e.g., alerts such as alert 124) to one or more computing devices, such as computing device 126. As another example, gateway device 340 may be positioned within a particular location, such as within a vehicle. For example, gateway device 140b is located within vehicle 103. In other examples, gateway device 340 may be positioned within a building, such as within gasoline station 130. Gateway device 340 may include a housing (not depicted) to protect the components of gateway device 340 (e.g., network interface 342, processor 344, user interface 348, power supply 350, and memory 346) from the weather or extreme operating conditions (e.g., high temperatures, low temperatures, and humidity).

Deploying gateway device 340 in the manner described herein may be unconventional or unexpected. In particular, electronics contained within gateway device 340 may be sensitive to extreme conditions (heat, cold, humidity). Yet, gateway device 340 may be deployed in various locations, such as outdoors (e.g., in yard 107), within a vehicle (e.g., vehicle 103), or within a facility, such as gasoline station 130. In implementations, to facilitate deployment of gateway device 340 in potentially harsh environment (e.g., outdoors), gateway device 340 may be water-proof and may be configured to be exposed to vibrations. For example, gateway device 340 may be housed in a trailer. In addition to being housed in a trailer, gateway device 340 may be enclosed within a housing made of a durable material such as hard plastic. The housing may include a safety harness, and weather-proof wiring may be placed within the safety harness to provide power from power supply 350. Further, the housing may include vein holes to permit water to pass through portions of the housing. Additionally, gateway device 340 (e.g., power supply 350 of gateway device 340) may include an additional fuse to handle potential power fluctuations.

Figure 4:
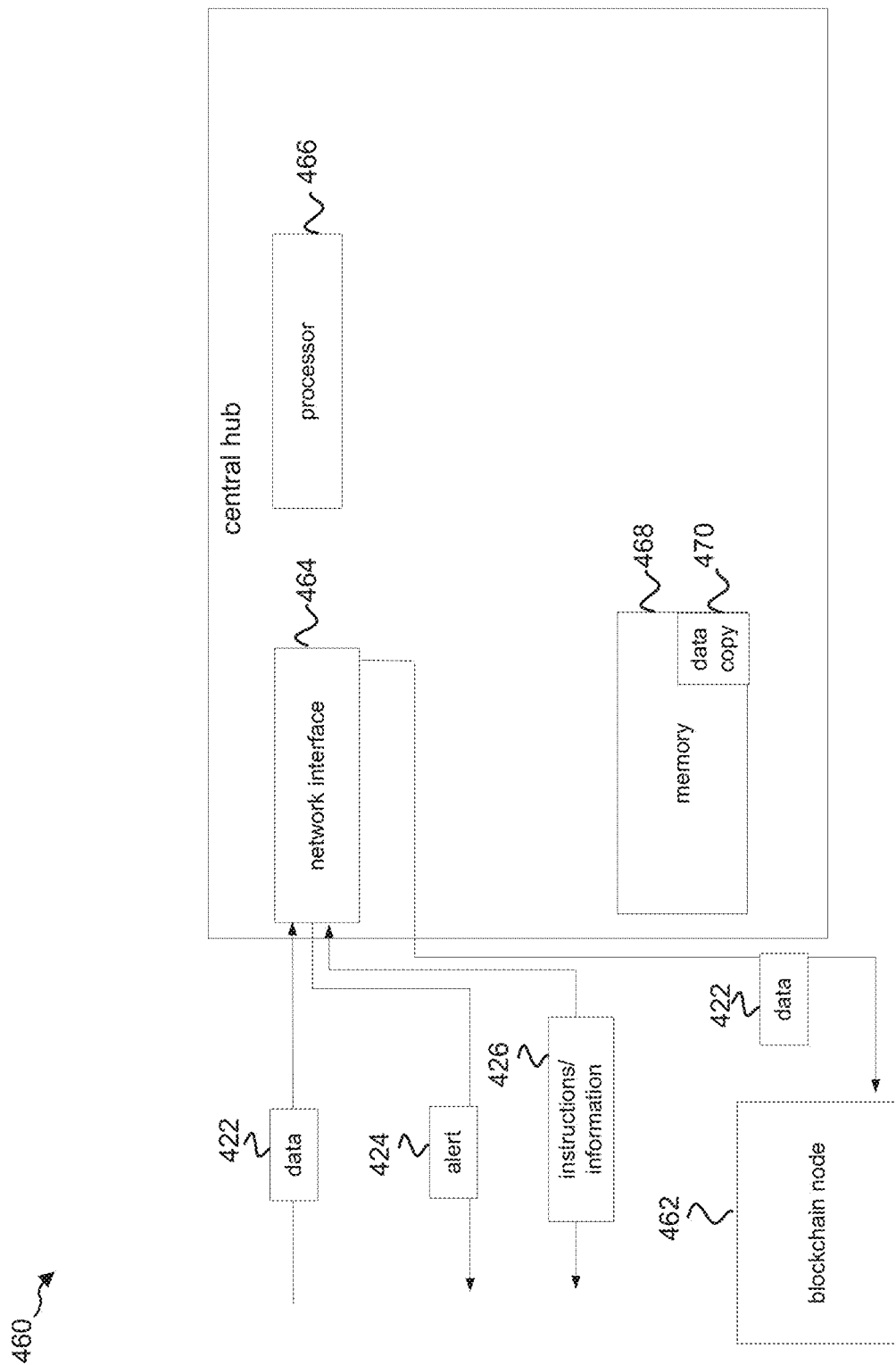
FIG. 4 depicts a central hub in accordance with embodiments of the present disclosure.

FIG. 4 depicts central hub 460. Central hub 460 may be configured to receive data 422 via a network, such as network 126 of FIG. 1, from a gateway device, such as gateway devices 140a-d, 340 of FIGS. 1 and 3, or from both. Central hub 460 may be configured to generate a copy of data 422 (referred to as data copy 470). Central hub 460 may also send data 422 to blockchain node 462. In an example, blockchain node 462 may be a blockchain server. Blockchain node 462 may be configured to store data 422 on a blockchain. Central hub 460 may perform operations on data copy 470. By storing data 422 on a blockchain while performing operations on data copy 470, central hub 460 is configured to solve the technological problem of generating unalterable records (e.g., unalterable data records) while preserving a copy of data 422 (e.g., data copy 470) so that operations can be performed on data copy 470. In this manner, measurements of physical conditions corresponding to environments in which sensors, such as sensor 200, are disposed together with time stamps corresponding to times at which these measurements were generated can be stored in a data structure that is tamper-resistant while permitting users of the system of networked computers on which the blockchain resides to access data 422. Thus, data collection can be automated while preserving data reliability.

Central hub 460 may include network interface 464, processor 466, and memory 468. Network interface 464 may be any wired or wireless component known in the art that is configured to send and receive data such as data 422 and alerts 424. In implementations, network interface 464 may include both wired and wireless functionality. Network interface 464 may be configured to receive data 422 from a network, such as network 126 of FIG. 1, and may be configured to send alerts 424 (e.g., alert messages) via the network (e.g., network 126 of FIG. 1) to gateway device 140*a-d*, 340 or directly to computing devices such as computing devices 126, 128, and 132 of FIG. 1. Further, network interface 464 may be configured to send and receive instructions/information 426. For instance, network interface 464 may send instructions to a gateway device (e.g., gateway device 340) and may receive information (e.g., status information) from the gateway device. Additionally, network interface 464 may be configured to send information directly to a gateway device (e.g., without first sending the information through a network such as network 126), such as gateway devices 140*a-d* and 340 and to receive information (e.g., data 122) directly from a gateway device, such as gateway devices 140*a-d*, 340. Notwithstanding, the foregoing, it is anticipated that in most implementations, central hub 460 will communicate with gateway devices (e.g., gateway device 340) via a network (e.g., network 126 of FIG. 1). Processor 466 may be configured to generate data copy 470 and may be configured to store data copy 470 in memory 468. Processor 466 may further be configured to perform operations on the data copy 470. Operations may include evaluation of the data copy 470 (e.g., statistical analysis) to identify a physical condition corresponding to an environment in which a sensor of the plurality of sensors is positioned. To elaborate, processor 466 may be configured to analyze the data copy 470 to identify a physical condition such as a temperature within a freezer compartment of a vehicle being above a set level (e.g., a level established by a user of system 100) or a level of gasoline within a gasoline tank as being below a set level (e.g., a level established by a user of system 100). In other examples, processor 466 may be configured to analyze the data copy 470 to identify a physical condition such as a temperature of a freezer located within an entity (e.g., a grocery store or restaurant) as being above a specified temperature, such as a temperature established by a regulatory authority (e.g., a state or municipal health authority) or by best practices of the entity. As another example, processor 466 may be configured to analyze data copy 470 to identify a physical condition associated with a product to which a sensor such as sensor 200 might be attached. For instance, sensor 200 may be a RFID tag attached to an item of clothing. Processor 466 may be configured to track a movement of the item of clothing through different locations of a supply chain by analyzing data copy 470.

In implementations, memory 468 may correspond to a database, and memory copy 470 may be stored in the database. For instance, the database may be an Oracle database, an SQL server, MySQL, MongoDB, or Couchbase. Further, the database may reside on networked computers. Thus, memory 468 may correspond to a network of devices configured to be accessed by processor 466.

Additionally, processor 466 may be configured to generate an alert (e.g., an alert message), such as alert 424, in response to identification of the physical condition. In an implementation, the alert may be an electronic mail message. As another example, the alert may be a text message. In some implementations, the alert may include instructions for addressing the identified physical condition. For example, if the physical condition corresponds to a temperature of a freezer in a store being outside a designated temperature range, the alert may advise a person at the store to destroy food kept in the freezer. Processor 466 may be further configured to cause network interface 464 to send the alert via a network, such as network 126 of FIG. 1, to a gateway device, such as gateway device 140*a-d*, 340 of FIGS. 1 and 3. The gateway device may then relay the alert to a computing device associated with the location at which the physical condition was identified or other appropriate computing device. For instance, if processor 464 identifies the physical condition as being a low level of gasoline in a gasoline storage tank (e.g., a level of gasoline in the gasoline storage tank that is below a designated level), processor 466 may cause network interface 464 to send the alert to a tanker truck so that the gasoline storage tank may be filled to the designated level. In other implementations, processor 466 may be configured to cause network interface 464 to send an alert to a computing device associated with a location at which the physical condition was identified via a network such as network 126 of FIG. 1. For instance, if, based on analyzing data copy 470, processor 466 identifies a temperature of a freezer located in a supermarket as being above a designated temperature (e.g., a temperature set by a health regulatory authority), processor may cause network interface 464 to send an alert, such as alert 424, to a computing device at the supermarket. The computing device at the supermarket may be any computing device including, without limitation, a handheld device (e.g., a smart phone) used by a clerk of the supermarket.

Moreover, processor 466 may be configured to generate an alert (e.g., an alert message), such as alert 424, in response to not receiving data, such as data 422, from a gateway device (e.g., gateway device 140*a-d*, 340). Failure to receive data (e.g., data 422) from a gateway device (e.g., gateway device 140*a-d*, 340) may indicate a failure in a gateway device or in a sensor providing data 422 to the gateway device. In an embodiment, memory 468 may include a map of each sensor and each gateway device in a system of sensors and gateway devices. For example, memory 468 may include a map of system 100 of FIG. 1. Processor 466 may be configured to periodically check to determine whether data has been received from a particular gateway device, from a particular sensor, or both. In response to not receiving data from the particular gateway device, from the particular sensor, or both within a designated timeframe (e.g., a timeframe set by a user of system 100), processor 466 may generate an alert to be sent to a computing device associated with the potentially malfunctioning sensor or gateway device.

Additionally, alerts (e.g., alert 424) may include different alert levels. For instance, an alert may be a low-level alert not necessitating an immediate response. To elaborate, if a physical condition corresponds to a small temperature fluctuation (within a specified variance) of an environment in which a sensor is disposed (such as freezer 114 of FIG. 1), alert 424 may be a low-level alert that does not require immediate action from a recipient. Alternatively and additionally, alert 424 may be a mid-level alert. A mid-level alert may indicate that action should be taken but may not necessarily indicate that immediate action should be taken. In implementations, alert 424 may correspond to a high-level alert. A high-level alert may require an immediate response from the recipient and may further require an acknowledgment that the response (e.g., specified in alert 424) has been taken. For example, if alert 424 indicates that a temperate in a location at which a sensor is disposed (e.g., freezer 114 of FIG. 1) has temperatures that deviate from specified temperature levels (e.g., acceptable levels stored in memory 468), alert 424 may require an immediate response from a recipient. In the foregoing example, processor 466 may be configured to check that a response from the recipient has been received in response to such a high-level alert (e.g., corresponding to alert 424).

In an implementation, in addition to or in lieu of sending an alert in response to identification of the physical condition, processor 466 may cause network interface 464 to send an instruction (e.g., instructions/information 426) via a network (e.g., network 126 of FIG. 1) to a gateway device, such as gateway device 140a-d, 340 of FIGS. 1 and 3, which may relay the instruction (e.g., instructions/information 426) to a computing device associated with a location at which the physical condition was identified or to another appropriate computing device. Alternatively, processor 466 may cause network interface 464 to send the instruction (e.g., instructions/information 426) via the network directly to the computing device associated with the location at which the physical condition was identified or to another appropriate computing device. In other implementations, the processor 466 may cause the network interface 464 to send the instruction (e.g., instructions/information 426) directly to the computing device at the affected location. As an example, if, based on analysis of data copy 470, processor 466 identifies that a temperature in a freezer compartment of a truck is above a designated temperature (e.g., a temperature mandated by a regulatory authority), processor 466 may cause network interface 464 to send an instruction (e.g., instructions/information 426) to a computing device associated with the truck, and the computing device associated with the truck may be configured to cause equipment within the freezer compartment of the truck to lower the temperature to the designated level.

Figure 5:
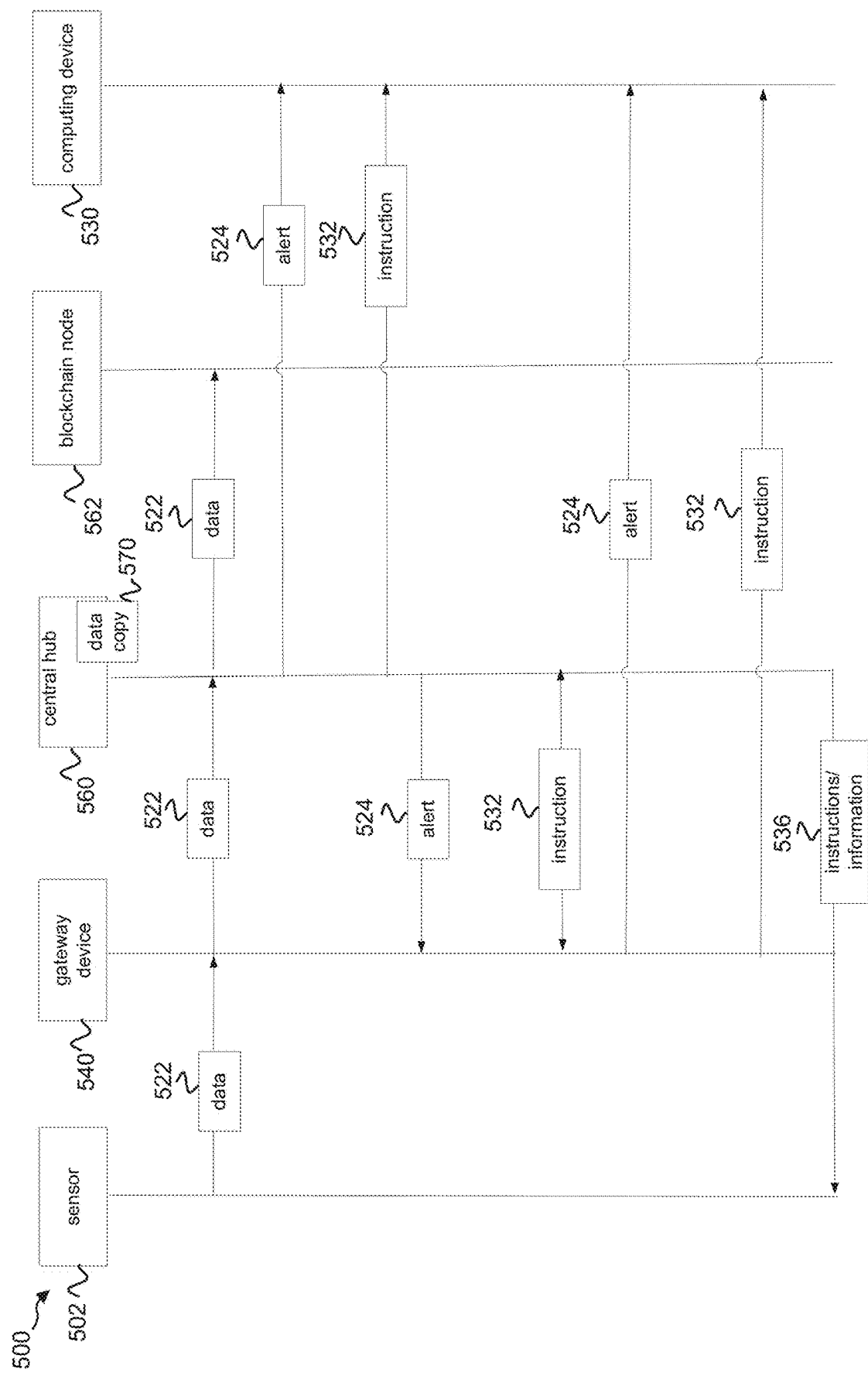
FIG. 5 is a network diagram depicting the flow of data, alerts, and instructions in accordance with embodiments of the present disclosure.

FIG. 5 is a network diagram 500 depicting the flow of data 522, alerts 524, and instructions 532 according to an implementation of the disclosure. Sensor 502, which may correspond to a sensor of a plurality of sensors and a plurality of sensor types disposed in various locations, may generate data 522 corresponding to physical measurements of locations at which a sensor, such as sensor 502, is located. Data 522 may be received at central hub 560 where data copy 570 is generated from data 522. Data 522 may be encoded on a blockchain so that data 522 may be stored in a tamper-resistant data structure. Meanwhile, central hub 560 may be configured to analyze data copy 570 to identify possible physical conditions at locations at which sensors are disposed. In response to identifying a physical condition, central hub 560 may generate an alert 524, an instruction 532, or both.

Sensor 502 may generate data 522. Data 522 may include measurements taken by sensor 502 and times (e.g., time stamps) at which each measurement was taken. Sensor 502 may send data 522 to gateway device 540. In an implementation, sensor 502 may send data 522 wirelessly or via wired means to gateway device 540. Gateway device 540 may route data 522 via a network to central hub 560. Central hub 560 may generate data copy 570. Data copy 570 may correspond to a copy of data 522. Central hub 560 may send data 522 to a blockchain node 562 via a network. Blockchain node 562, which may correspond to a blockchain server, may store data 522 on a blockchain. In particular blockchain node 562 may be configured to store data 522 using a cryptographic hash as is known in the art and may further be configured to concatenate the cryptographically hashed data with a nonce. Data 522 may be available to users of a blockchain network that corresponds to the blockchain node 562. In particular, any user of a node of the blockchain network associated with blockchain node 562 may access data 522. Since data 522 is stored on the blockchain, data 522 is tamper-resistant (e.g., a user of the node of the blockchain network may access data 522 but may not alter data 522 due to the cryptographic hash). Central hub 560 (e.g., a processor of central hub 560) may process data copy 570. As an example central hub 560 may perform statistical analysis on data copy 570 to identify a physical condition associated with a location at which sensor 502 is positioned. As another example, central hub 560 may apply machine learning techniques (e.g., Bayesian inference) to identify a physical condition associated with a location at which sensor 502 is positioned based on analysis, at central hub 560, of data copy 570.

If, based on the analysis, central hub 560 identifies a physical condition associated with the location at which sensor 502 is disposed, central hub 560 may generate an alert 524, an instruction 532, or both. Alert 524 may be an electronic mail message or a text message indicating that a physical condition exists at the location at which sensor 502 is disposed. Instruction 532 may be computer readable instructions configured to cause a processor of a computing device to perform operations in response to receipt of instruction 532. In an implementation, central hub 560 may send alert 524, instruction 532, or both to gateway device 540. Gateway device 540 may route alert 524, instruction 532, or both to computing device 530 associated with the location at which sensor 502 is disposed. Further, in implementations, central hub 560 may be configured to receive instruction 532 from gateway device 540. As an example, gateway device 540 may send an instruction (e.g., instruction 532) to central hub 560 to cause central hub 560 to poll all of the gateway devices on a system (e.g., system 100) to determine the status of all of the gateway devices. In another implementation, central hub 560 may send alert 524, instruction 532, or both directly to computing device 530 as shown in FIG. 5 (e.g., without sending alert 524, instruction 532, or both to gateway device 540). Computing device 530 may be any computing device associated with a location at which sensor 502 is disposed, such as a smartphone, a laptop computer, or other computing device known in the art. Computing device 530 may include a user interface configured to display alert 524 such that a user of computing device 530 can perceive alert 524. Computing device 530 may be coupled to (e.g., communicatively coupled to) instrumentation associated with a location at which sensor 502 is positioned. For example, sensor 502 may be positioned in a freezer located in a supermarket. Computing device 530 may be a computer (e.g., a personal computer) located within the supermarket and coupled to instrumentation of the freezer (e.g., a compressor and other instrumentation configured to manipulate a temperature within the freezer). In response to receipt of instruction 532 at computing device 530, computing device 530 may cause instrumentation associated with the freezer to lower a temperature within the freezer to a level specified in instruction 532.

In implementations, central hub 560 may send instruction/information 536 to sensor 502. For instance, information sent to a sensor (e.g., sensor 502) may correspond to a condition associated with another sensor or with another device within a system (e.g., system 100). An instruction sent to sensor 502 may correspond to an instruction to measure a physical condition of an environment in which sensor 502 is disposed and to send associated data 522 to central hub 560.

Figure 6:
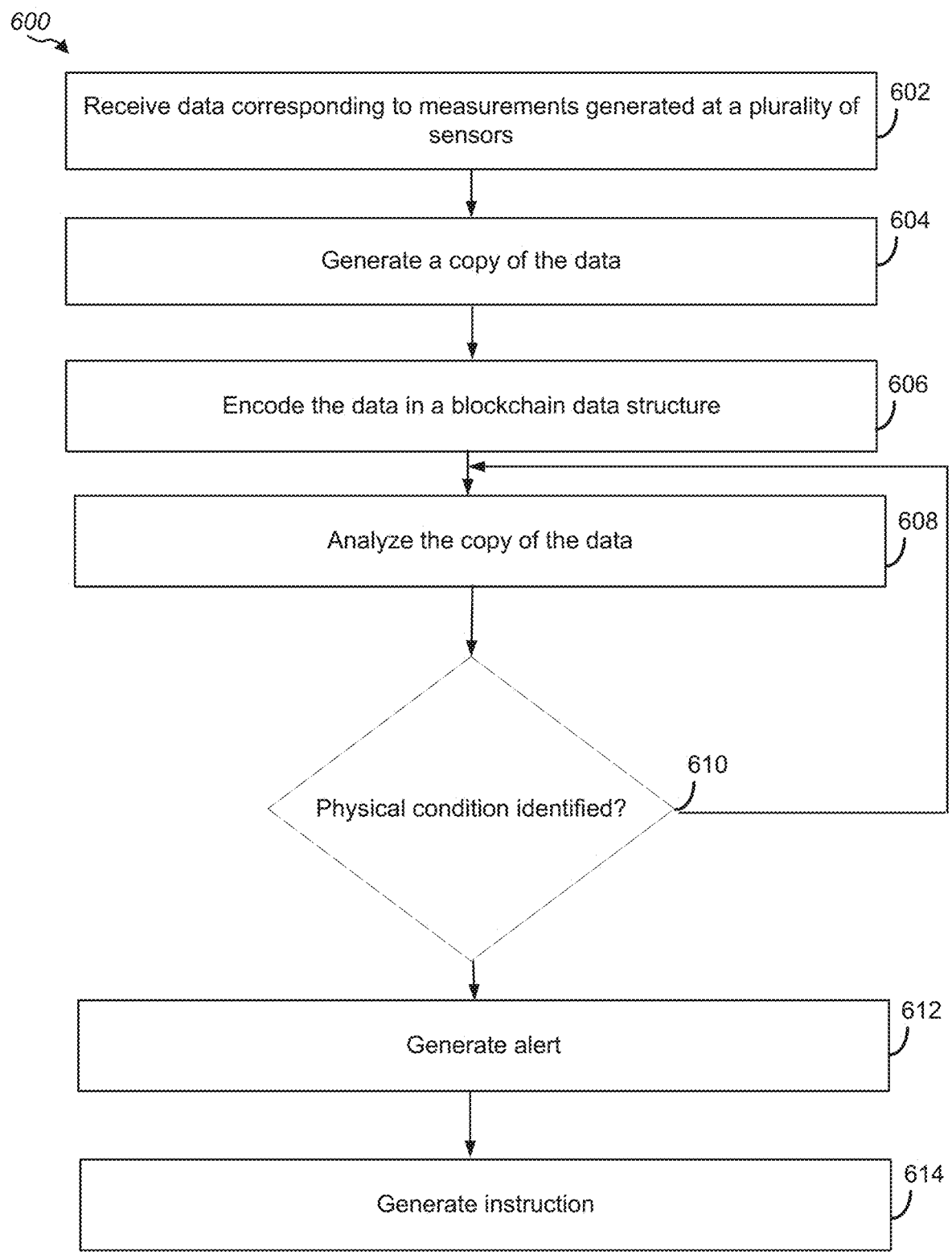
FIG. 6 depicts an exemplary method for generating tamper-resistant data according to an embodiment of the present disclosure.

FIG. 6 depicts an exemplary method 600 for generating tamper-resistant data according to an embodiment of the disclosure. Received data is encoded on to a blockchain. Thus, the data is stored in a tamper-resistant data structure corresponding to the blockchain. A copy of the data is made. Analysis is performed on a copy of the data.

At block 602, data corresponding to measurements generated at a plurality of sensors may be received. For instance, data corresponding to physical measurements (e.g., temperature, pressure, fluid level) and times at which these physical measurements were captured may be received at a central hub, such as central hub 160, 460, 560. The physical measurements may be made at a plurality of sensors and at a plurality of sensor types (e.g., temperature sensor, pressure sensor, light sensor, fluid level sensor) disposed in a plurality of physical locations.

At block 604, a copy of the data may be generated. For instance, a central hub, such as central hub 160, 460, 560 may generate a copy of the data. The copy of the data may be stored in a memory, such as memory 468 of central hub 460. The copy of the data may be accessed by a processor, such as processor 466 of central hub 460.

At block 606, the data is encoded in a blockchain data structure. In an embodiment, the data may be sent to a blockchain server configured to encode the data into blockchain blocks. In other implementations, the data may be sent to a plurality of blockchain nodes (e.g., computing devices) at which the data is encoded into blockchain blocks. In an example, the data is encoded by passing the data through an encryption hash and concatenating the output of the encryption hash with a nonce. The encoded data may be accessed by users of the blockchain network. However, the encoded data may be tamper-resistant such that a user cannot alter the data. Thus, the encoded data may correspond to a temper-resistant record of measurements at times at which the measurements were taken.

At block 608, the copy of the data may be analyzed. In an implementation, a processor, such as processor 468 of central hub 460, may access the copy of the data stored in a memory, such as memory 468 of central hub 460. The processor may be configured to analyze the copy of the data. For instance, the processor may perform various statistical analyses on the copy of the data. In implementations, machine learning algorithms that operate on a central hub, such as central hub 460, may receive a copy of the data and may identify patterns within the copy of the data through analysis of the data.

At block 610, it may be determined whether a physical condition is identified based on analysis of the data. A physical condition may correspond to an event or a phenomenon associated with an environment in which a sensor is disposed. Additionally or alternatively, a physical condition may correspond to a physical condition of an item. For example, a physical condition may correspond to a temperate in freezer in a supermarket, the temperature indicative of spoliation of products stored in the freezer. As another example, certain chemicals, such as organic peroxides, must be stored at certain temperatures to prevent the chemicals from exploding. A physical condition may correspond to a temperature within a chemical storage facility being outside a desired temperature range (e.g., a safe temperature range). If a physical condition is not identified, the process may return to block 608. Otherwise, if a physical condition is identified, method 600 may proceed to block 612. At block 612, an alert may be generated in response to the identification of the physical condition. In implementations, the alert may be sent, either directly, or indirectly, to a computing device. A user of the computing device may receive the alert and may take appropriate action in response to receipt of the alert. At block 614, an instruction may be generated. The instruction may be a computer-readable instruction that causes a computer to perform certain functions. For example, in an embodiment, an instruction may cause a computer to automatically lower a temperature of a freezer to avoid further damage to products contained within the freezer.

Figure 7:
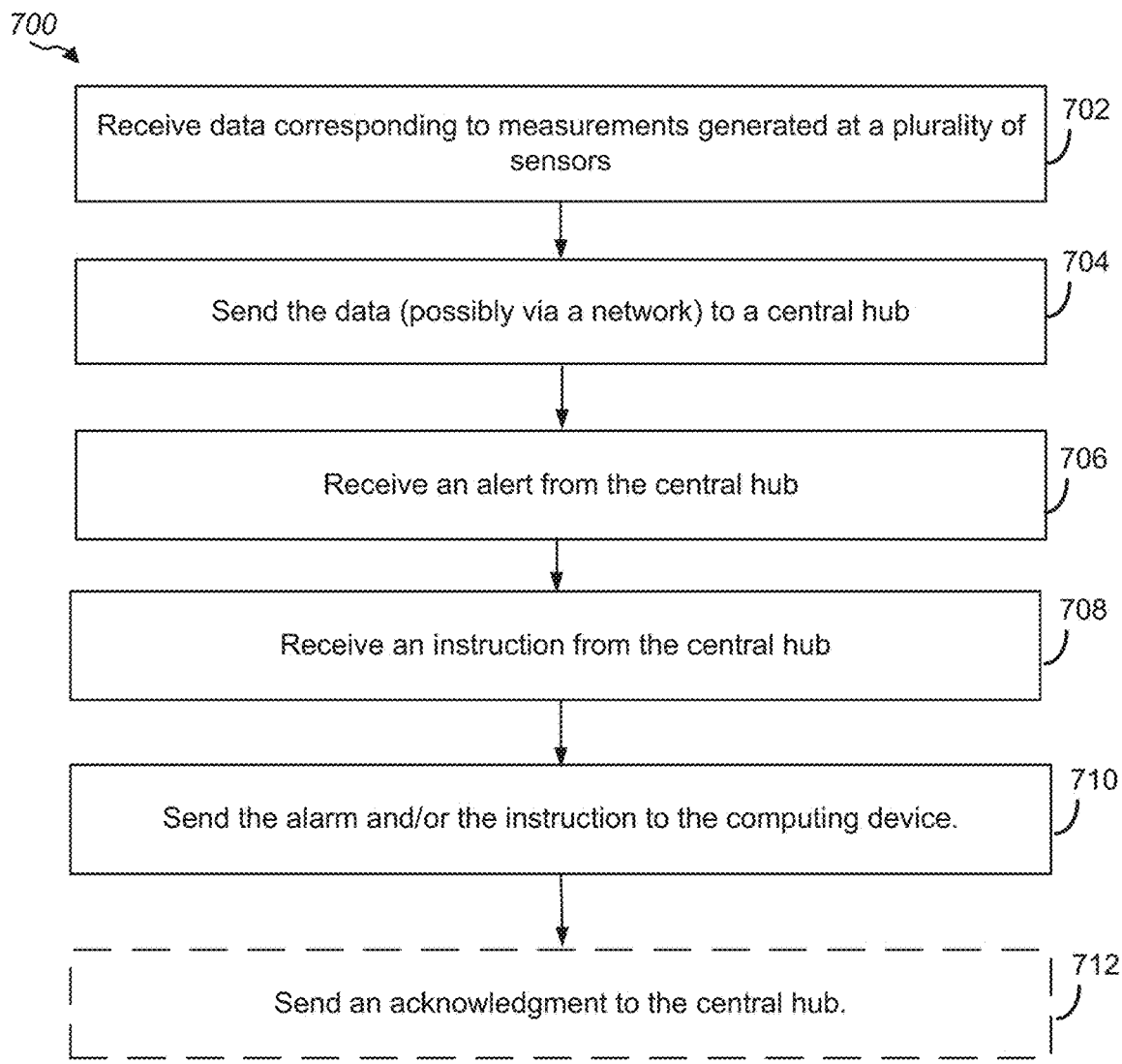
FIG. 7 is an alternative exemplary method for generating tamper-resistant data according to an embodiment of the present disclosure.

FIG. 7 is an alternative exemplary method for generating tamper-resistant data according to an embodiment of the disclosure. At 702, data corresponding to measurements and times at which these measurements are taken may be received from a plurality of sensors and a plurality of sensor types at a gateway device, such as gateway device 140a-d, 340. The sensors of the plurality of sensors and of the plurality of sensor types may be disposed at a plurality of locations. In an implementation, a gateway device may receive information (e.g., data 122) from a plurality of sensors and a plurality of sensor types disposed in a plurality of locations and the gateway device may send information to (e.g., alerts such as alert 124) a plurality of computing devices associated with a location. Additionally, a gateway device may exchange information with other gateway devices.

At block 704, the data may be sent via a network to a central hub. For instance, the gateway device may send the data to a central hub, such as central hub 160, 460, 560 via a network. In another implementation, gateway device may send the data directly to central hub 160, 460, 560 (e.g., without first sending the data through a network). In an embodiment, a network interface of central hub may receive the data. A processor of the central hub may make a copy of the data and may store a copy of the data in a memory of the central hub. A processor of the central hub may cause the network interface of the central hub to send the data to a node of a blockchain network. The data may be encoded by the node of the blockchain network onto a blockchain data structure. The processor of the central hub may access the copy of the data stored in the memory. The processor of the central hub may analyze the copy of the data to identify patterns within the copy of the data indicative of a physical condition at a location at which a sensor of the plurality of sensors and of the plurality of sensor types is positioned. In response to detection or identification of a physical condition at the location at which the senor of the plurality of sensors and of the plurality of sensor types is positioned, the processor of the central hub may cause the network interface of the central hub to send an alert to the gateway device via a network. Additionally and alternatively, the processor of the central hub may cause the network interface of the central hub to send a computer-readable instruction to the gateway device via the network. In other implementations, the central hub may send an alert or an instruction directly to a computing device associated with a location at which a physical condition is identified.

At block 706, the gateway device may receive the alert from the central hub via the network or directly from the central hub. In an example, a network interface of the gateway device may be configured to receive the alert from the central hub. Further, at block 708, the network interface of the gateway device may receive the instruction from the central hub. The alert and the instruction may include header data indicative of a computing device to which to send the alert and the instruction. A processor of the gateway device may parse the header data to identify an address of a computing device to which to send the alert and the instruction. At block 710, the gateway device may send the alert and the instruction to the computing device corresponding to the address identified within the header data of the alert and of the instruction. The computing device may be associated with a location of a sensor at which a physical condition was identified. In response to receipt of alert and the instruction at the computing device, the computing device may be configured to send an acknowledgement (e.g., an acknowledgment message) to the gateway device. At block 712, the gateway device may send the acknowledgment to the central hub.

In addition to the disclosures hereof, disclosed is a device for generation of tamper-resistant data. The device for the generation of tamper-resistant data includes means for interfacing with a network. The means for interfacing with a network may correspond to a network interface known in the art, such as a modem or a transceiver. The means for interfacing with a network may have wireless functionality, wired functionality, or both. The means for interfacing with a network may be configured to receive and to send data, such as data 122, 222, 322, 422, or 522, and to send alerts, such as alerts 124, 224, 324, 424, or 524. The device for the generation of the tamper-resistant data may further include means for processing data. The means for processing data may correspond to any processor or processors known in the art, such as Intel Core™ processors. The means for processing data may correspond to a group of processors operating in parallel. The means for processing data may be configured to generate a copy of the data (e.g., a copy of data 122, 222, 322, 422, or 522) and may be further configured to perform operations on the copy of the data. The device for the generation of the tamper-resistant data additionally may include means for storing the copy of the data. The means for storing the copy of the data may correspond to any computer memories known in the art. In an implementation, the device for the generation of the tamper-resistant data may be communicatively coupled to means for routing data such as data 122, 222, 322, 422, or 522. The means for routing data may be configured to receive data 122, 222, 322, 422, or 522 from the means for sensing data. The means for routing data may further be configured to receive and send alerts such as alerts 124, 224, 324, 424, or 524. The means for routing data may correspond to the gateway device 140*a-d*, 340, or 540. The means for sensing data may correspond to a sensor, such as sensors 104*a-d*, 108, 112, or 200. The means for sensing data may be configured to generate measurements at particular time instances that correspond to physical conditions of an environment in which the means for sensing data are deployed.

EXAMPLES

The following are implementation examples to provide a more complete understanding of the disclosed devices, systems and methods. It is appreciated that these examples are provided for the sake of providing clarity on how one or more embodiments may be implemented. The examples are not intended to be limiting.

Example 1

Food Temperature Monitoring

As an example, a sensor may be present within a refrigeration compartment of a truck. The refrigeration compartment may contain perishable products, such as food. The sensor may, from time to time, measure temperatures within the refrigeration compartment of the truck. The sensor may send data, corresponding to temperature measurements and times at which these temperature measurements were taken, to a gateway device. The gateway device may be positioned on the truck or, alternatively, the gateway device may be located elsewhere (e.g., in a truck yard). The gateway device may relay the data to a central hub. The central hub may generate a copy of the data. The central hub may send the data to a node of a blockchain network. The node of the blockchain network may correspond to a server. The blockchain network may include a plurality of computing devices corresponding to blockchain nodes. The data may be stored on a blockchain data structure. Accordingly, the data stored on the blockchain data structure may be tamper-resistant; yet, the data stored on the blockchain data structure may be accessible to each node (e.g., computing device) on the blockchain network. The central hub may perform analytics on the copy of the data. The analytics may include statistical analysis such as Bayesian analysis. Based on the analysis performed on the data, the central hub may identify a physical condition within the refrigeration compartment of the truck. The physical condition may correspond to a temperature of the refrigeration compartment deviating from allowed ranges (e.g., ranges set by an owner of the truck or ranges set by a regulatory authority). In response to identifying the physical condition, the central hub may send an alert, an instruction, or both to the gateway device. The gateway device may relay the alert, the instruction, or both to a computing device associated with the truck. The computing device may correspond to a hand-held computing device (e.g., a smart phone) used by an operator of the truck. The alert may indicate to the operator of the truck that a refrigeration unit of the refrigeration compartment has malfunctioned. The alert may further instruct the operator of the truck to destroy the items stored within the refrigeration compartment of the truck.

Additionally, a second sensor may be located on the truck. The second sensor may be configured to provide supplemental data. The supplemental data may indicate conditions associated with the truck, with the refrigeration unit, or both. For example, the second sensor may include a sensor configured to monitor reserve fuel on a generator that powers the refrigeration unit. The second sensor may send the supplemental data to the central hub. The central hub may generate a copy of the supplemental data. The central hub may send the supplemental data to a blockchain node (e.g., a blockchain server). The central hub may be configured to analyze the copy of the supplemental data. Based on the analysis of the copy of the supplemental data, the central hub may determine that the fuel level on the generator is low. The central hub may send an alert to a computing device associated with the truck. For instance, the computing device may be a hand-held device used by an operator of the truck. The alert may indicate that the fuel level is low and may further indicate that fuel should be added. If no acknowledgment message is received at the central hub within a designated timeframe (e.g., a timeframe set by a user of the system, such as system 100), the central hub may send a second alert to a second computing device. The second computing device may be associated with a manager of the trucking operation of which the truck is a component. The second alert may indicate that a first alert was sent, that no response was received, and that action must be taken within a specified timeframe to avoid spoliation of perishable items (e.g., food) in the refrigeration unit of the truck.

Example 2

Monitoring a Level of Gasoline in a Gasoline Station

An owner or an operator of a gasoline station may be required to account for the amount of gasoline received and sold at the gasoline station. In an example, a gasoline tank of a gasoline station may include a sensor to measure a level of gasoline stored within the gasoline tank. The sensor may send data, corresponding to gasoline levels taken at particular times, to a gateway device. The gateway device may be positioned within the gasoline station. The gateway device may relay the data to a central hub. The central hub may generate a copy of the data. The central hub may send the data to a blockchain node where the data may be stored on a blockchain. The central hub may further perform analytics on the copy of the data. The analytics may indicate that the gasoline station has not accurately accounted for the amount of gasoline delivered to the gasoline station and the amount of gasoline sold at the gasoline station. The central hub may send an alert to a computing device. The computing device may be associated with an auditor of a company that owns the gasoline station. The alert may indicate to the auditor that an audit should be performed on the gasoline station.

Example 3

Monitoring a Freezer in a Supermarket

A freezer positioned within a supermarket may contain perishable products that should be maintained within a particular temperature range. The freezer may include a sensor. The sensor may measure a temperature within the freezer. The sensor may send data, corresponding to temperature measurements of the freezer and times at which these measurement were taken, to a gateway device. The gateway device may be located within a supermarket at which the freezer is positioned. The gateway device may relay the data to a central hub. The central hub may generate a copy of the data. The central hub may store the data on a blockchain. The blockchain may be stored on a blockchain node of a blockchain network. The blockchain network may include a plurality of nodes (e.g., computing devices capable of storing and accessing the blockchain). The central hub may analyze the copy of the data. Analysis of the copy of the data may include performing statistical analyses on the copy of the data. Additionally or alternatively, analysis of the copy of the data may include using computer learning algorithms to identify patterns within the copy of the data. The central hub may identify a physical condition within the freezer based on the analysis of the copy of the data. The physical condition may correspond to a temperature of the freezer deviating from an acceptable range for a designated timeframe. In response to identifying the physical condition, the central hub may send an alert to a computing device associated with the supermarket. The computing device may correspond to a laptop of a manager of the supermarket. The alert may instruct the manager of the supermarket to destroy the items contained within the freezer.

Example 4

Monitoring a Building

Energy efficiency of structures (e.g., homes, office buildings, factories, stores) is becoming increasingly important as the climate changes. A sensor may be disposed within a building (e.g., an office building). The sensor may measure conditions associated with air within the building. The conditions may include a temperature of the air. Further, the conditions may include an amount of particulate matter (e.g., pollutants) within the air of the building. The sensor may send the data, corresponding to the foregoing physical measurements and the times at which these measurements were taken, to a gateway device. The gateway device may be located within the building. The gateway device may send the data to a central hub. The central hub may generate a copy of the data. The central hub may send the data to a blockchain node of a blockchain network. The central hub may analyze the copy of the data. Based on the analysis of the copy of the data, the central hub may identify that the building uses excessive energy (e.g., due to an incorrectly or inappropriately set thermostat). The central hub may send an instruction to a computing device associated with the building. The instruction may cause the thermostat to change a set point temperature of the building.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 2-4) may comprise processors, electronics devices, hardware devices, electronics components, logical circuits, memories, software codes, firmware codes, etc., or any combination thereof. In addition, features discussed herein relating to FIGS. 1-7 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIGS. 2-4) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. For example, memory 468 may correspond to a database stored in a plurality of different memories located on a network. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this disclosure. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A device for generating tamper-resistant data, the device comprising:
   a network interface configured to receive data, wherein the data corresponds to measurements generated at a plurality of sensors and times at which the measurements were generated; and
   a processor coupled to the network interface, wherein the processor is configured to:
      generate a copy of the data,
      store the copy of the data in a memory coupled to the processor,
      cause the network interface to send the data to a blockchain node,
      analyze the copy of the data to identify a physical condition corresponding to an environment in which a sensor of the plurality of sensors and of the plurality of sensor types is positioned,
      generate an alert in response to identification of the physical condition, and
      cause the network interface to send the alert to a gateway device via a network, wherein the gateway device is communicatively coupled to the plurality of sensors, and wherein the gateway device is configured to send the alert to a computing device associated with the environment.

2. The device of claim 1, wherein the blockchain node corresponds to a blockchain server, wherein the blockchain node is configured to encode the data into one or more blockchain blocks, wherein the blockchain blocks are accessible by a plurality of computing devices, and wherein the measurements include temperature measurements.

3. The device of claim 1, wherein the gateway device is further configured to:
   receive the data from the sensor of the plurality of sensors and of the plurality of sensor types; and
   send the data to the network interface via the network.

4. The device of claim 3, wherein the plurality of sensors comprises a plurality of sensor types configured to measure different physical conditions of environments in which each sensor of the plurality of sensors is positioned.

5. The device of claim 4, wherein the sensor is positioned in a compartment of a vehicle, wherein the sensor is configured to measure a temperature of the compartment, and wherein the physical condition corresponds to the temperature.

6. The device of claim 5, wherein the computing device is associated with the vehicle, and wherein the processor is further configured to evaluate the copy of the data to identify a second physical condition corresponding to a second environment in which a second sensor of the plurality of sensors is positioned.

7. The device of claim 6, wherein the second sensor of the plurality of sensors is positioned in a gasoline storage tank, wherein the second sensor is configured to measure a level of gasoline in the gasoline storage tank, wherein the second physical condition corresponds to the level of gasoline, and wherein the second environment corresponds to the gasoline storage tank.

8. The device of claim 7, wherein the processor is further configured to:
   generate a second alert in response to identification of the second physical condition, and
   cause the network interface to send the second alert to the gateway device via the network, wherein the gateway device is configured to send the second alert to a second computing device associated with a gasoline station at which the gasoline storage tank is located.

9. A method for generating tamper-resistant data, the method comprising:
   receiving data corresponding to measurements generated at a plurality of sensors and a plurality of sensor types, wherein the data further comprises data corresponding to a physical condition at a location of the plurality of sensors and time stamps corresponding to when each measurement of the measurements was generated;
   sending the data to be encoded in a blockchain data structure;
   generating a copy of the data; and
   analyzing the copy of the data to identify a physical condition corresponding to an environment in which a sensor of the plurality of sensors and of the plurality of sensor types is deployed.

10. The method of claim 9, the method further comprising generating an alert message in response to identifying the physical condition corresponding to the environment.

11. The method of claim 10, the method further comprising sending the alert message to a gateway device, wherein the gateway device is configured to route the alert message to a computing device associated with the environment.

12. The method of claim 11, the method further comprising in response to sending the alert message, receiving an acknowledgment message from the computing device via the gateway device.

13. The method of claim 12, the method further comprising, after sending the alert message, sending an instruction to the computing device via the gateway device, wherein the computing device is configured to adjust the physical condition based on the instruction, and wherein the instruction comprises computer-readable code.

14. The method of claim 13, wherein the environment corresponds to a freezer positioned in a vehicle or in a building, wherein the freezer includes a control system configured to receive the instruction, and wherein the control system corresponds to the computing device.

15. The method of claim 9, wherein the plurality of sensor types include a temperate sensor, a pressure sensor, and a fluid level sensor.

16. A system for generating tamper-resistant data, the system comprising:
   a plurality of sensors, wherein the plurality of sensors comprise a plurality of sensor types, wherein sensors of the plurality of sensors are positioned in different locations, and wherein the sensors of the plurality of sensors and of the plurality of sensor types are configured to measure physical conditions of locations in which the sensors are positioned;
   a gateway device communicatively coupled to the plurality of sensors, wherein the gateway device is configured to receive data from the sensors of the plurality of sensors, and wherein the data includes measurements corresponding to the physical conditions and time stamps corresponding to times at which the measurements were generated; and
   a central hub coupled to the gateway device via a network, wherein the central hub is configured to:
   generate a copy of the data, and
   send the data to a blockchain node after generation of the copy of the data.

17. The system of claim 16, wherein the blockchain node corresponds to a blockchain server, and wherein the central hub is further configured to:
   analyze the copy of the data, and
   generate an alert signal in response to detection of a condition based on analysis of the copy of the data.

18. The system of claim 17, wherein the central hub is further configured to send the alert signal to the gateway device, and wherein the gateway device is further configured to send the alert signal to a computing device associated with a location in which the condition is detected.

19. The system of claim 17, wherein the condition corresponds to a physical condition of a location at which a sensor of the plurality of sensors is positioned, and wherein the central hub configured to analyze the copy of the data comprises the central hub configured to execute machine learning algorithms to identify patterns in the copy of the data indicative of a physical condition corresponding to a location at which a sensor of the plurality of sensors is deployed.

20. The system of claim 16, wherein the blockchain node is configured to store the data in blockchain blocks, and wherein the blockchain blocks are accessible via a computing device of a plurality of computing devices.

* * * * *